United States Patent
Hafner et al.

[11] Patent Number: 6,008,306
[45] Date of Patent: Dec. 28, 1999

[54] THERMAL METATHESIS POLYMERIZATION PROCESS AND A POLYMERISABLE COMPOSITION

[75] Inventors: Andreas Hafner, Laupen; Paul Adriaan Van Der Schaaf, Fribourg; Andreas Mühlebach, Belfaux, all of Switzerland

[73] Assignee: Ciba Specialty Chemicals Corporation, Tarrytown, N.Y.

[21] Appl. No.: 08/836,421

[22] PCT Filed: Nov. 6, 1995

[86] PCT No.: PCT/EP95/04360

§ 371 Date: May 14, 1997

§ 102(e) Date: May 14, 1997

[87] PCT Pub. No.: WO96/16100

PCT Pub. Date: May 30, 1996

[30] Foreign Application Priority Data

Nov. 17, 1994 [CH] Switzerland .............................. 3465/94

[51] Int. Cl.⁶ ...................................................... C08F 4/80
[52] U.S. Cl. ........................... 526/171; 526/260; 526/172; 526/280; 526/281; 526/283; 526/309
[58] Field of Search ...................................... 526/171, 283, 526/172, 280, 281, 260, 309

[56] References Cited

FOREIGN PATENT DOCUMENTS 9313171  7/1993  WIPO .
9507310  3/1995  WIPO .

OTHER PUBLICATIONS

Mueting et al., Inorg. Synth. (1992) 29, 279–98.
Yoshida et al., Polym J. (Tokyo) (1998) 30 (10), 819–823.
Demonceau et al, Journal of Molecular Catalysis, vol. 76, (1992), pp. 123–132.

*Primary Examiner*—Fred Zitomer
*Attorney, Agent, or Firm*—Luther A. R. Hall; David R. Crichton

[57] ABSTRACT

Composition of (a) at least one strained cycloolefin and (b) a catalytic quantity of at least one divalent-cationic compound of ruthenium or osmium with a metal atom, to which are bound 1 to 3 tertiary phosphine ligands with, in the case of the ruthenium compounds, sterically exacting substituents, optionally non-photolabile neutral ligands and anions for charge balancing, with the proviso that in ruthenium (trisphenylphosphine)dihalides or hydride-halides the phenyl groups are substituted by $C_1$–$C_{18}$alkyl, $C_1$–$C_{18}$haloalkyl or $C_1$–$C_{18}$alkoxy. The composition is suitable for the production of molded parts of all kinds and of coatings.

35 Claims, No Drawings

THERMAL METATHESIS POLYMERIZATION PROCESS AND A POLYMERISABLE COMPOSITION

The present invention relates to a process for the thermal polymerization of strained cycloolefins; a thermally polymerizable composition of such a cycloolefin and a one-component catalyst for thermally induced metathesis polymerization; and carrier materials coated with the thermally polymerizable or the crosslinked polymers.

Demonceau et al. [Demonceau, A., Noels, A. F., Saive, E., Hubert, A. J., J. Mol. Catal. 76:123–132 (1992)] describes [$(C_6H_5)_3P]_3RuCl_2$, (p-cymene)$RuCl_2P(C_6H_{11})_3$ and [$(C_6H_5)_3P]_3RuHCl$ as thermal catalysts for ring-opening metathesis polymerization of norbornene, a fused polycycloolefin. Because the activity is too low, these catalysts have not found acceptance in industrial preparation. It has therefore been suggested that the activity be increased by the addition of diazo esters. It is also mentioned that only (p-cymene) $RuCl_2P(C_6H_{11})_3$ is capable of polymerizing norbornene in a relatively short time at 60° C. Cyclooctene is also mentioned as a further monomer.

WO 93/13171 describes air- and water-stable one-component and two-component catalysts based on molybdenum compounds and tungsten compounds containing carbonyl groups and ruthenium compounds and osmium compounds with at least one polyene ligand for the thermal metathesis polymerization and a photoactivated metathesis polymerization of strained cycloolefins, in particular norbornene and norbornene derivatives. No other polycyclical—above all non-fused polycyclical—cycloolefins are mentioned. The one-component catalysts of the ruthenium compounds used, that is to say [Ru(cumene)$Cl_2]_2$ and [$(C_6H_6)Ru(CH_3CN)_2Cl]^+PF_6^-$, can indeed be activated by UV irradiation; however, the storage stability of the compositions with norbornene is completely inadequate. These catalysts are capable of replacing the known two-component catalysts only inadequately.

It has now been found, surprisingly, that divalent-cationic ruthenium and osmium complexes are highly active one-component catalysts for thermally induced metathesis polymerization if they contain at least one phosphine group with bulky substituents bound to the metal atom. It has furthermore been found that the compositions are stable to air and moisture and can be processed without safety precautions. The polymerizable compositions comprising ruthenium and osmium complexes are moreover sufficiently stable, so that they do not polymerize before the desired type of processing.

The invention relates to a composition of (a) at least one strained cycloolefin and (b) a catalytic quantity of at least one divalent-cationic compound of ruthenium or osmium, wherein the ruthenium or osmium compound contains a metal atom to which are bound 1 to 3 tertiary phosphine ligands with, in the case of the ruthenium compounds, sterically exacting substituents, optionally non-photolabile neutral ligands and anions for charge balancing, with the proviso that in ruthenium (trisphenylphosphine)dihalides or hydride-halides the phenyl groups are substituted by $C_1$–$C_{18}$alkyl, $C_1$–$C_{18}$haloalkyl or $C_1$–$C_{18}$alkoxy.

The cyclical olefins can be monocyclical or polycyclical condensed or bridged ring systems, having for example from two to four rings, which are unsubstituted or substituted and can contain heteroatoms, for example O, S, N or Si in one or more rings and/or can contain condensed aromatic or heteroaromatic rings, for example o-phenylene, o-naphthylene, o-pyridinylene or o-pyrimidinylene. The individual cyclical rings can contain 3 to 16, preferably 3 to 12 and, particularly preferably, 3 to 8 ring members. The cyclical olefins can include further nonaromatic double bonds, depending on the ring size preferably 2 to 4 such additional double bonds. The ring substituents are those which are inert, in other words which do not adversely affect the chemical stability of the ruthenium compounds and osmium compounds. The cycloolefins are strained rings or ring systems.

If the cyclical olefins contain more than one double bond, for example 2 to 4 double bonds, crosslinked polymers can also form, depending on the reaction conditions, the monomer chosen and the amount of catalyst.

In a preferred embodiment of the process according to the invention, the cycloolefins correspond to the formula I

(I)

in which $Q_1$ is a radical having at least one carbon atom which, together with the —CH=$CQ_2$ group, forms an at least 3-membered alicyclical ring which optionally contains one or more heteroatoms chosen from the group consisting of silicon, phosphorus, oxygen, nitrogen and sulfur; and which is unsubstituted or substituted by halogen, =O, —CN, —NO$_2$, $R_1R_2R_3Si$—(O)$_u$-, —COOM, —SO$_3$M, —PO$_3$M, —COO($M_1$)$_{1/2}$, —SO$_3$($M_1$)$_{1/2}$—PO$_3$($M_1$)$_{1/2}$, $C_1$–$C_{20}$-alkyl, $C_1$–$C_{20}$hydroxyalkyl, $C_1$–$C_{20}$haloalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or $R_4$—X—; or in which two adjacent C atoms are substituted by —CO—O—CO— or —CO—NR$_5$—CO—; or in which an alicyclical, aromatic or heteroaromatic ring which is unsubstituted or substituted by halogen, —CN, —NO$_2$, $R_6R_7R_8Si$—(O)$_u$-, —COOM, —SO$_3$M, —PO$_3$M, —COO($M_1$)$_{1/2}$, —SO$_3$($M_1$)$_{1/2}$, —PO$_3$($M_1$)$_{1/2}$, $C_1$–$C_{20}$alkyl, $C_1$–$C_{20}$haloalkyl, $C_1$–$C_{20}$hydroxyalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or $R_{13}$—$X_1$—is optionally fused onto adjacent carbon atoms of the alicyclical ring;

X and $X_1$ independently of one another are —O—, —S—, —CO—, —SO—, —SO$_2$—, —O—C(O)—, —C(O)—O—, —C(O)—NR$_5$—, —NR$_{10}$—C(O)—, —SO$_2$—O— or —O—SO$_2$—;

$R_1$, $R_2$ and $R_3$ independently of one another are $C_1$–$C_{12}$alkyl, $C_1$–$C_{12}$perfluoroalkyl, phenyl or benzyl;

$R_4$ and $R_{13}$ independently are $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl;

$R_5$ and $R_{10}$ independently of one another are hydrogen, $C_1$–$C_{12}$alkyl, phenyl or benzyl, where the alkyl groups in turn are unsubstituted or substituted by $C_1$–$C_{12}$alkoxy or $C_3$–$C_8$cycloalkyl;

$R_6$, $R_7$ and $R_8$ independently of one another are $C_1$–$C_{12}$alkyl, $C_1$–$C_{12}$perfluoroalkyl, phenyl or benzyl;

M is an alkali metal and $M_1$ is an alkaline earth metal; and u is 0 or 1;

where the alicyclical ring formed with $Q_1$ optionally contains further nonaromatic double bonds;

$Q_2$ is hydrogen, $C_1$–$C_{20}$alkyl, $C_1$–$C_{20}$haloalkyl, $C_1$–$C_{12}$alkoxy, halogen, —CN or $R_{11}$—$X_2$—; $R_{11}$ is $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl;

$X_2$ is —C(O)—O— or —C(O)—$NR_{12}$—;

$R_{12}$ is hydrogen, $C_1$–$C_{12}$alkyl, phenyl or benzyl;

where the abovementioned cycloalkyl, heterocycloalkyl, aryl, heteroaryl, aralkyl and heteroaralkyl groups are unsubstituted or substituted by $C_1$–$C_{12}$alkyl, $C_1$–$C_{12}$alkoxy, —$NO_2$, —CN or halogen, and where the heteroatoms of the abovementioned heterocycloalkyl, heteroaryl and heteroaralkyl groups are chosen from the group consisting of —O—, —S—, —$NR_9$— and —N=; and $R_9$ is hydrogen, $C_1$–$C_{12}$alkyl, phenyl or benzyl.

Fused-on alicyclical rings preferably contain 3 to 8, particularly preferably 4 to 7, and especially preferably 5 or 6 ring C atoms.

If an asymmetric center is present in the compounds of the formula I, the compounds can occur in optically isomeric forms as a result. Some compounds of the formula I can occur in tautomeric forms (for example keto-enol tautomerism). If an aliphatic C=C double bond is present, geometric isomerism (E form or Z form) can also occur. Exo-endo configurations are furthermore also possible. Formula I thus includes all the possible stereoisomers which are present in the form of enantiomers, tautomers, diastereomers, E/Z isomers or mixtures thereof.

In the definitions of the substituents, the alkyl, alkenyl and alkynyl groups can be straight-chain or branched. The same also applies to the alkyl or each alkyl moiety of alkoxy, alkylthio, alkoxycarbonyl and further alkyl-containing groups. These alkyl groups preferably contain 1 to 12, more preferably 1 to 8, and particularly preferably 1 to 4 C atoms. These alkenyl and alkynyl groups preferably contain 2 to 12, more preferably 2 to 8, and particularly preferably 2 to 4 C atoms.

Alkyl includes, for example, methyl, ethyl, isopropyl, n-propyl, n-butyl, iso-butyl, sec-butyl, tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Hydroxyalkyl includes, for example, hydroxymethyl, hydroxyethyl, 1-hydroxyisopropyl, 1-hydroxy-n-propyl, 2-hydroxy-n-butyl, 1-hydroxy-iso-butyl, 1-hydroxy-sec-butyl, 1-hydroxy-tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Haloalkyl includes, for example, fluoromethyl, difluoromethyl, trifluoromethyl, chloromethyl, dichloromethyl, trichloromethyl, 2,2,2-trifluoroethyl, 2-fluoroethyl, 2-chloroethyl, 2,2,2-trichloroethyl and halogenated, in particular fluorinated or chlorinated, alkanes, such as, for example, the isopropyl, n-propyl, n-butyl, iso-butyl, sec-butyl and tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Alkenyl includes, for example, propenyl, isopropenyl, 2-butenyl, 3-butenyl, isobutenyl, n-penta-2,4-dienyl, 3-methyl-but-2-enyl, n-oct-2-enyl, n-dodec-2-enyl, iso-dodecenyl, n-octadec-2-enyl and n-octadec4-enyl.

Cycloalkyl is preferably $C_5$–$C_8$cycloalkyl, in particular $C_5$— or $C_6$cycloalkyl. Some examples are cyclopropyl, dimethylcyclopropyl, cyclobutyl, cyclopentyl, methylcyclopentyl, cyclohexyl, cycloheptyl and cyclooctyl.

Cyanoalkyl includes, for example, cyanomethyl (methylnitrile [sic]), cyanoethyl (ethylnitrile [sic]), 1-cyanoisopropyl, 1-cyano-n-propyl, 2-cyano-n-butyl, 1-cyano-iso-butyl, 1-cyano-sec-butyl, 1-cyano-tert-butyl and the various isomeric cyanopentyl and -hexyl radicals.

Aralkyl preferably contains 7 to 12 C atoms, and particularly preferably 7 to 19 C atoms. It can be, for example, benzyl, phenethyl, 3-phenylpropyl, α-methylbenzyl, phenbutyl or α,α-dimethylbenzyl.

Aryl preferably contains 6 to 10 C atoms. It can be, for example, phenyl, pentalin, indene, naphthalene, azulene or anthracene.

Heteroaryl preferably contains 4 or 5 C atoms and one or two heteroatoms from the group consisting of O, S and N. It can be, for example, pyrrole, furan, thiophene, oxazole, thiazole, pyridine, pyrazine, pyrimidine, pyridazine, indole, purine or quinoline.

Heterocycloalkyl preferably contains 4 or 5 C atoms and one or two heteroatoms from the group consisting of O, S and N. It can be, for example, oxirane, azirine, 1,2-oxathiolane, pyrazoline, pyrrolidine, piperidine, piperazine, morpholine, tetrahydrofuran or tetrahydrothiophene.

Alkoxy is, for example, methoxy, ethoxy, propyloxy, i-propyloxy, n-butyloxy, i-butyloxy, sec-butyloxy and t-butyloxy.

Alkali metal in the context of the present invention is to be understood as meaning lithium, sodium, potassium, rubidium and cesium, in particular lithium, sodium and potassium.

Alkaline earth metal in the context of the present invention is to be understood as meaning beryllium, magnesium, calcium, strontium and barium, in particular magnesium and calcium.

In the above definitions, halogen is to be understood as meaning fluorine, chlorine, bromine and iodine, preferably fluorine, chlorine and bromine.

Compounds of the formula I which are particularly suitable for the process according to the invention are those in which $Q_2$ is hydrogen.

Compounds of the formula I which are furthermore preferred for the polymerization are those in which the alicyclical ring which $Q_1$ forms together with the —CH=$CQ_2$— group has 3 to 16, more preferably 3 to 12, and particularly preferably 3 to 8 ring atoms, where the ring system can be monocyclical, bicyclical, tricyclical or tetracyclical.

The process according to the invention can be carried out particularly advantageously with those compounds of the formula I in which $Q_1$ is a radical with at least one carbon atom which, together with the —CH=$CQ_2$— group, forms a 3- to 20-membered alicyclical ring which optionally contains one or more heteroatoms chosen from the group consisting of silicon, oxygen, nitrogen and sulfur; and which is unsubstituted or substituted by halogen, =O, —CN, —$NO_2$, $R_1R_2R_3$Si—$(O)_u$—, —COOM, —$SO_3$M, —$PO_3$M, —COO$(M_1)_{1/2}$, —$SO_3(M_1)_{1/2}$, —$PO_3(M_1)_{1/2}$, $C_1$–$C_{12}$alkyl, $C_1$–$C_{12}$haloalkyl, $C_1$–$C_{12}$hydroxyalkyl, $C_1$–$C_4$cyanoalkyl, $C_3$–$C_6$cycloalkyl, $C_6$–$C_{12}$aryl, $C_7$–$C_{12}$aralkyl, $C_3$–$C_6$heterocycloalkyl, $C_3$–$C_{12}$heteroaryl, $C_4$–$C_{12}$heteroaralkyl or $R_4$—X—; or in which two adjacent C atoms in this radical $Q_1$ are substituted by —CO—O—CO— or —CO—$NR_5$—CO—; or in which an alicyclical, aromatic or heteroaromatic ring which is unsubstituted or substituted by halogen, —CN, —$NO_2$, $R_6R_7R_8$Si—, —COOM, —$SO_3$M, —$PO_3M$, —$COO(M_1)_{1/2}$, —$SO_3(M_1)_{1/2}$, —$PO_3(M_1)_{1/2}$, $C_1$–$C_{12}$alkyl, $C_1$–$C_{12}$haloalkyl, $C_1$–$C_{12}$hydroxyalkyl, $C_1$–$C_4$cyanoalkyl, $C_3$–$C_6$cycloalkyl, $C_6$–$C_{12}$aryl, $C_7$–$C_{12}$aralkyl, $C_3$–$C_6$heterocycloalkyl, $C_3$–$C_{12}$heteroaryl, $C_4$–$C_{12}$heteroaralkyl or $R_{13}$—$X_1$— is optionally fused onto adjacent carbon atoms;

X and $X_1$ independently of one another are —O—, —S—, —CO—, —SO—, —$SO_2$—, —O—C(O)—, —C(O)—O—, —C(O)—$NR_5$—, —$NR_{10}$—C(O)—, —$SO_2$—O— or —O—$SO_2$—;

$R_1$, $R_2$ and $R_3$ independently of one another are $C_1$–$C_6$alkyl, $C_1$–$C_6$perfluoroalkyl, phenyl or benzyl;

M is an alkali metal and $M_1$ is an alkaline earth metal;

$R_4$ and $R_{13}$ independently of one another are $C_1$–$C_{12}$alkyl, $C_1$–$C_{12}$haloalkyl, $C_1$–$C_{12}$hydroxyalkyl, $C_3$–$C_8$cycloalkyl, $C_6$–$C_{12}$aryl or $C_7$–$C_{12}$aralkyl;

$R_5$ and $R_{10}$ independently of one another are hydrogen, $C_1$–$C_6$alkyl, phenyl or benzyl, where the alkyl groups in turn are unsubstituted or substituted by $C_1$–$C_6$alkoxy or $C_3$–$C_6$cycloalkyl;

$R_6$, $R_7$ and $R_8$ independently of one another are $C_1$–$C_6$alkyl, $C_1$–$C_6$perfluoroalkyl, phenyl or benzyl;

u is 0 or 1;

where the alicyclical ring formed with $Q_1$ optionally contains further nonaromatic double bonds;

$Q_2$ is hydrogen, $C_1$–$C_{12}$alkyl, $C_1$–$C_{12}$haloalkyl, $C_1$–$C_6$alkoxy, halogen, —CN or $R_{11}$—$X_2$—; $R_{11}$ is $C_1$–$C_{12}$alkyl, $C_1$–$C_{12}$haloalkyl, $C_1$–$C_{12}$hydroxyalkyl, $C_3$–$C_6$cycloalkyl, $C_6$–$C_{12}$aryl or $C_7$–$C_{12}$aralkyl;

$X_2$ is —C(O)—O— or —C(O)—$NR_{12}$; and $R_{12}$ is hydrogen, $C_1$–$C_6$alkyl, phenyl or benzyl;

where the cycloalkyl, heterocycloalkyl, aryl, heteroaryl, aralkyl and heteroaralkyl groups are unsubstituted or substituted by $C_1$–$C_6$alkyl, $C_1$–$C_6$alkoxy, —$NO_2$, —CN or halogen, and where the heteroatoms of the heterocycloalkyl, heteroaryl and heteroaralkyl groups are chosen from the group consisting of —O—, —S—, —$NR_9$— and —N=; and $R_9$ is hydrogen, $C_1$–$C_6$alkyl, phenyl or benzyl.

Preferred compounds of the formula I from this group are those in which $Q_1$ is a radical with at least one carbon atom which, together with the —CH=$CQ_2$— group, forms a 3- to 10-membered alicyclical ring which optionally contains a heteroatom chosen from the group consisting of silicon, oxygen, nitrogen and sulfur and is unsubstituted or substituted by halogen, —CN, —$NO_2$, $R_1R_2R_3Si$—, —COOM, —$SO_3M$, —$PO_3M$, —$COO(M_1)_{1/2}$, —$SO_3(M_1)_{1/2}$, —$PO_3(M_1)_{1/2}$, $C_1$–$C_6$alkyl, $C_1$–$C_6$haloalkyl, $C_1$–$C_6$hydroxyalkyl, $C_1$–$C_4$cyanoalkyl, $C_3$–$C_6$cycloalkyl, phenyl, benzyl or $R_4$—X—; or in which an alicyclical, aromatic or heteroaromatic ring which is unsubstituted or substituted by halogen, —CN, —$NO_2$, $R_6R_7R_8Si$—, —COOM, —$SO_3M$, —$PO_3M$, —$COO(M_1)_{1/2}$, —$SO_3(M_1)_{1/2}$, —$PO_3(M_1)_{1/2}$, $C_1$–$C_6$alkyl, $C_1$–$C_6$haloalkyl, $C_1$–$C_6$hydroxyalkyl, $C_1$–$C_4$cyanoalkyl, $C_3$–$C_6$cycloalkyl, phenyl, benzyl or $R_{13}$—$X_1$— is optionally fused onto adjacent carbon atoms;

$R_1$, $R_2$ and $R_3$ independently of one another are $C_1$–$C_4$alkyl, $C_1$–$C_4$perfluoroalkyl, phenyl or benzyl;

M is an alkali metal and $M_1$ is an alkaline earth metal;

$R_4$ and $R_{13}$ independently of one another are $C_1$–$C_6$alkyl, $C_1$–$C_6$haloalkyl, $C_1$–$C_6$hydroxyalkyl or $C_3$–$C_6$cycloalkyl;

X and $X_1$ independently of one another are —O—, —S—, —CO—, —SO— or —$SO_2$—;

$R_6$, $R_7$ and $R_8$ independently of one another are $C_1$–$C_4$alkyl, $C_1$–$C_4$perfluoroalkyl, phenyl or benzyl;

and $Q_2$ is hydrogen.

The process according to the invention is particularly suitable for polymerization of norbornene and norbornene derivatives. Particularly preferred compounds from these norbornene derivatives are those which correspond either to the formula II

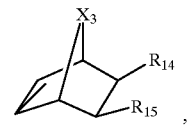

(II)

in which $X_3$ is —$CHR_{16}$—, oxygen or sulfur;

$R_{14}$ and $R_{15}$ independently of one another are hydrogen, —CN, trifluoromethyl, $(CH_3)_3Si$—O—, $(CH_3)_3Si$— or —$COOR_{17}$; and $R_{16}$ and $R_{17}$ independently of one another are hydrogen, $C_1$–$C_{12}$-alkyl, phenyl or benzyl;

or to the formula III

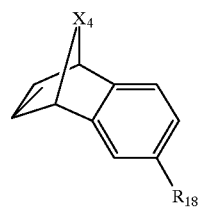

(III)

in which $X_4$ is —$CHR_{19}$—, oxygen or sulfur;

$R_{19}$ is hydrogen, $C_1$–$C_{12}$alkyl, phenyl or benzyl; and $R_{18}$ is hydrogen, $C_1$–$C_6$alkyl or halogen;

or to the formula IV

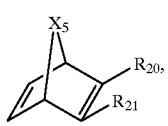

(IV)

in which $X_5$ is —$CHR_{22}$—, oxygen or sulfur;

$R_{22}$ is hydrogen, $C_1$–$C_{12}$alkyl, phenyl or benzyl;

$R_{20}$ and $R_{21}$ independently of one another are hydrogen, CN, trifluoromethyl, $(CH_3)_3Si$—O—, $(CH_3)_3Si$— or —$COOR_{23}$; and $R_{23}$ is hydrogen, $C_1$–$C_{12}$alkyl, phenyl or benzyl;

or to the formula V
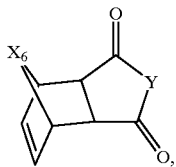
(V)
in which
$X_6$ is —$CHR_{24}$—, oxygen or sulfur;
$R_{24}$ is hydrogen, $C_1$–$C_{12}$alkyl, phenyl or benzyl;
Y is oxygen or
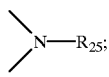
and $R_{25}$ is hydrogen, methyl, ethyl or phenyl.
The following compounds of the formula I are particularly suitable for the polymerization process according to the invention, bi- and polycyclical systems being accessible by Diels-Alder reactions:
(1)
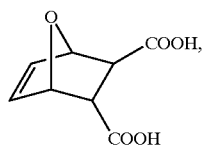
(2)
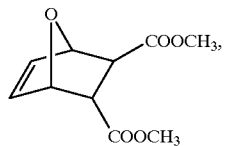
(3)
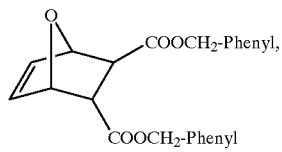
(4)
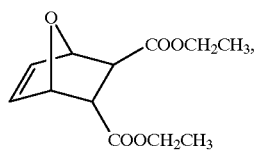
(5)
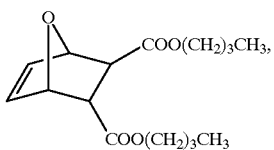
(6)
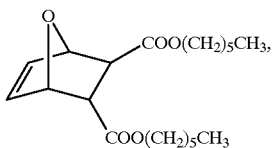
(7)
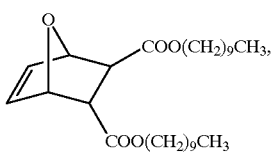
(8)
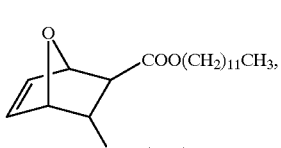
(9)
(10)
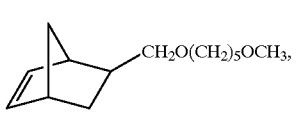
(11)
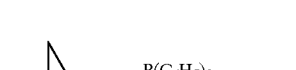
(12)
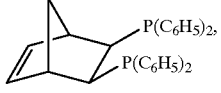
(13)
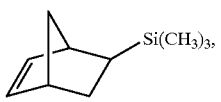
(14)
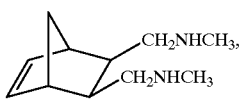
(15)

-continued
(16)
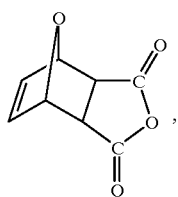
(17)
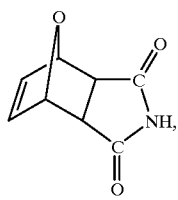
(18)
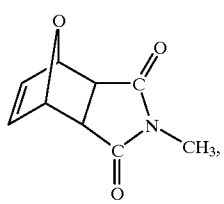
(19)
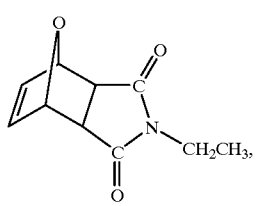
(20)
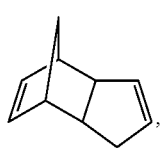
(21)
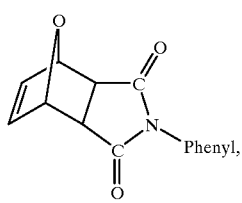
(22)
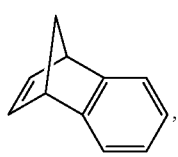
(23)
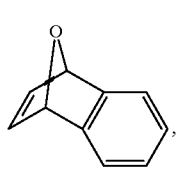
-continued
(24)
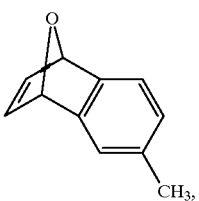
(25)
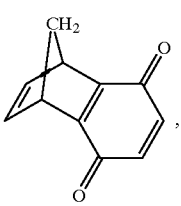
(26)
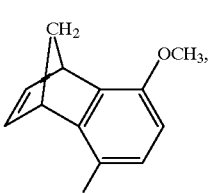
(27)
(28)
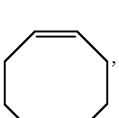
(29)
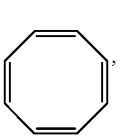
(30)
(31)
(32)
(33)
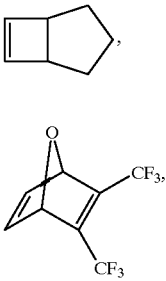

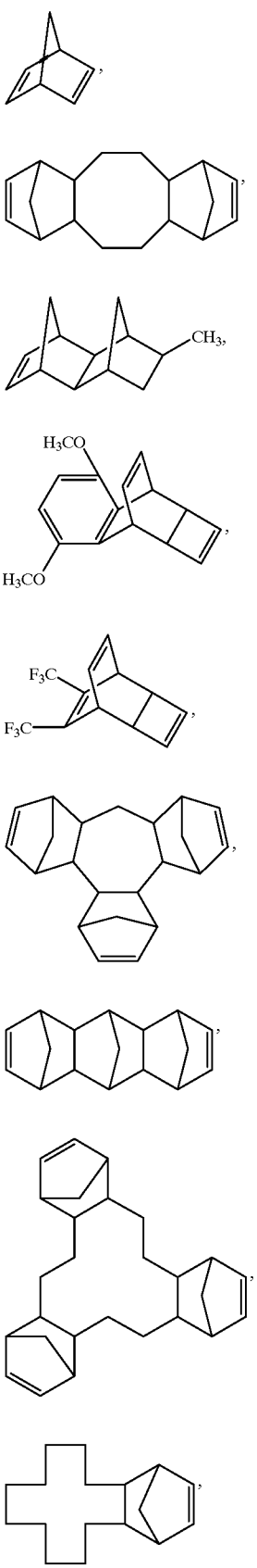

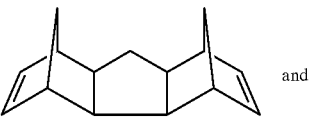

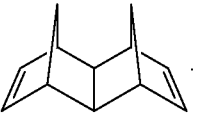

In a preferred embodiment, the cycloolefins contain only carbon and hydrogen atoms, and are preferably 5- or 6-membered rings or ring systems with one to three 5- or 6-membered rings, for example norbornene, alkylated norbornenes and dicyclopentadiene.

The ruthenium and osmium compounds preferably contain 2 or 3 tertiary phosphine groups. Phosphine groups in the context of the invention are understood as meaning tertiary phosphines. The number of additional non-photolabile neutral ligands depends on the one hand on the number of phosphine ligands and on the other hand on the valency of the neutral ligands. Monovalent neutral ligands are preferred.

In a preferred embodiment, the divalent-cationic ruthenium and osmium compounds to be used according to the invention contain 3 phosphine groups and 2 monovalent anions for charge balancing; or 3 phosphine groups, two monovalent or one divalent non-photolabile neutral ligands, and two monovalent anions for charge balancing; or 2 phosphine groups, one monoanionic, additionally monovalent non-photolabile neutral ligands, and one monovalent anion for charge balancing.

Non-photolabile ligand (also called highly coordinating ligand) in the context of the present invention means that the ligand does not dissociate, or dissociates to only an insignificant extent, from the catalyst on irradiation of the catalyst in the visible or near ultraviolet range of the spectrum.

The monoanionic, additionally monovalent non-photolabile neutral ligands are preferably cyclopentadienyl or indenyl, which are unsubstituted or substituted by 1 to 5 $C_1$–$C_4$alkyl, in particular methyl, or —Si($C_1$–$C_4$alkyl), in particular —Si($CH_3$)$_3$.

The non-photolabile ligands can be, for example, solvating inorganic and organic compounds which contain the heteroatoms O, S or N and are often also used as solvents. Examples of such compounds are $H_2O$, $H_2S$, $NH_3$; optionally halogenated, in particular fluorinated or chlorinated, aliphatic or cycloaliphatic alcohols or mercaptans having 1 to 18, preferably 1 to 12, and particularly preferably 1 to 6 C atoms, aromatic alcohols or thiols having 6 to 18, preferably 6 to 12 C atoms, araliphatic alcohols or thiols having 7 to 18, preferably 7 to 12 C atoms; open-chain or cyclical and aliphatic, araliphatic or aromatic ethers, thioethers, sulfoxides, sulfones, ketones, aldehydes, carboxylic acid esters, lactones, optionally N—$C_1$–$C_4$mono- or -dialkylated carboxylic acid amides having 2 to 20, preferably 2 to 12, and in particular 2 to 6 C atoms, and optionally N—$C_1$–$C_4$alkylated lactams; open-chain or cyclical and aliphatic, araliphatic or aromatic primary, secondary and tertiary amines having 1 to 20, preferably 1 to 12, and particularly preferably 1 to 6 C atoms.

Examples of such non-photolabile ligands are methanol, ethanol, n- and i-propanol, n-, i- and t-butanol, 1,1,1- trifluoroethanol, bistrifluoromethylmethanol, tristrifluoromethylmethanol, pentanol, hexanol, methyl- or ethylmercaptan, cyclopentanol, cyclohexanol, cyclohexylmercaptan, phenol, methylphenol, fluorophenol, phenylmercaptan, benzylmercaptan, benzyl alcohol, diethyl ether, dimethyl ether, diisopropyl ether, di-n- or di-t-butyl ether, tetrahydrofuran, tetrahydropyran, dioxane, diethyl thioether, tetrahydrothiophene, dimethyl sulfoxide, diethyl sulfoxide, tetra- and pentamethylene sulfoxide, dimethyl sulfone, diethyl sulfone, tetra- and pentamethylene sulfone, acetone, methyl ethyl ketone, diethyl ketone, phenyl methyl ketone, methyl isobutyl ketone, benzyl methyl ketone, acetaldehyde, propionaldehyde, trifluoroacetaldehyde, benzaldehyde, ethyl acetate, butyrolactone, dimethylformamide, dimethylacetamide, pyrrolidone and N-methylpyrrolidone, indenyl, cyclopentadienyl, methyl- or dimethyl- or pentamethylcyclopentadienyl and trimethylsilylcyclopentadienyl.

The primary amines can correspond to the formula $R_{26}NH_2$, the secondary amines can correspond to the formula $R_{26}R_{27}NH$ and the tertiary amines can correspond to the formula $R_{26}R_{27}R_{28}N$, in which $R_{26}$ is $C_1$–$C_{18}$alkyl, $C_5$—or $C_6$cycloalkyl which is unsubstituted or substituted by $C_1$–$C_4$alkyl or $C_1$–$C_4$alkoxy, or $C_6$–$C_{18}$aryl or $C_7$–$C_{12}$aralkyl which are unsubstituted or substituted by $C_1$–$C_4$alkyl or $C_1$–$C_4$alkoxy, $R_{27}$ independently has the meaning of $R_{26}$, or $R_{26}$ and $R_{27}$ together are tetramethylene, pentamethylene, 3-oxa-1,5-pentylene or —$CH_2$—$CH_2$—NH—$CH_2$—$CH_2$— or —$CH_2$—$CH_2$—N($C_1$–$C_4$alkyl)—$CH_2$—$CH_2$—, and $R_{28}$ independently has the meaning of $R_{26}$. The alkyl preferably contains 1 to 12, and particularly preferably 1 to 6 C atoms. The aryl preferably contains 6 to 12 C atoms and the aralkyl preferably contains 7 to 9 C atoms. Examples of amines are methyl-, dimethyl-, trimethyl-, ethyl-, diethyl-, triethyl-, methyl-ethyl-, dimethyl-ethyl-, n-propyl-, di-n-propyl-, tri-n-butyl-, cyclohexyl-, phenyl- and benzylamine, and pyrrolidine, N-methylpyrrolidine, piperidine, piperazine, morpholine and N-methylmorpholine.

In a preferred subgroup, the non-photolabile ligands are $H_2O$, $NH_3$ and $C_1$–$C_4$alkanols which are unsubstituted or partly or completely fluorinated, or cyclopentadienyl. $H_2O$, $NH_3$, cyclopentadienyl, methanol and ethanol are especially preferred.

Sterically exacting substituents in the context of the invention are understood as meaning those which shield the ruthenium and osmium atoms sterically. It has thus been found, surprisingly, that linear alkyl groups as substituents in the phosphine ligands give ruthenium compounds without any thermal activity for metathesis polymerization of strained cycloolefins. It has also been found that in the case of osmium compounds, linear alkyl groups as substituents in the phosphine ligands surprisingly have an excellent thermocatalytic activity for the metathesis polymerization of strained cycloolefins; however, phosphine ligands with sterically exacting substituents are also preferably used for the osmium compounds. It has furthermore been found that the steric shielding of triphenylphosphine ligands is inadequate in ruthenium dihalides and ruthenium hydride-halides, and such catalyts have only a moderate catalytic activity for the metathesis polymerization of strained cycloolefins. Surprisingly, the catalytic activity can be increased considerably if the tertiary phosphine groups contain phenyl which is substituted by alkyl or alkoxy groups.

The phosphine ligands preferably correspond to the formulae VI or VIa $$PR_{29}R_{30}R_{31} \quad (VI)$$

$$R_{29}R_{30}P\text{—}Z_1\text{—}PR_{29}R_{30} \quad (VIa)$$

in which $R_{29}$, $R_{30}$ and $R_{31}$ independently of one another are α-branched $C_3$–$C_{20}$alkyl; $C_4$–$C_{12}$cycloalkyl which is unsubstituted or substituted by $C_1$–$C_{18}$alkyl, $C_1$–$C_{18}$haloalkyl or $C_1$–$C_{18}$alkoxy; or $C_6$–$C_{16}$aryl which is unsubstituted or substituted by $C_1$–$C_{18}$alkyl, $C_1$–$C_{18}$haloalkyl or $C_1$–$C_{18}$alkoxy;

the radicals $R_{29}$ and $R_{30}$ together are tetra- or pentamethylene which is unsubstituted or substituted by $C_1$–$C_6$alkyl, $C_1$–$C_6$haloalkyl or $C_1$–$C_6$alkoxy, or tetra- or pentamethylene which is unsubstituted or substituted by $C_1$–$C_6$alkyl, $C_1$–$C_6$haloalkyl or $C_1$–$C_6$alkoxy and fused with 1 or 2 1,2-phenylene, and $R_3$ has the abovementioned meaning; and $Z_1$ is linear or branched $C_2$—$C_{12}$alkylene which is unsubstituted or substituted by $C_1$–$C_4$alkoxy, 1,2- or 1,3-cycloalkylene which has 4 to 8 C atoms and is unsubstituted or substituted by $C_1$–$C_4$alkyl or $C_1$–$C_4$alkoxy, or 1,2 or 1,3-heterocycloalkylene which has 5 or 6 ring members and one heteroatom from the group consisting of O and N and is unsubstituted or substituted by $C_1$–$C_4$alkyl or $C_1$—$C_4$alkoxy.

The radicals $R_{29}$, R30 and $R_{31}$ are preferably identical radicals. Substituents are preferably in one or both ortho- and/or meta-positions relative to the C atom of the P—C bond in the phosphine.

Alkyl $R_{29}$, $R_{30}$ and $R_{31}$ can contain 3 to 12, preferably 3 to 8, and particularly preferably 3 to 6 C atoms. It is preferably α-branched alkyl, for example of the formula —$CR_bR_cR_d$, in which $R_b$ is H or $C_1$–$C_{12}$alkyl, $R_c$ is $C_1$–$C_{12}$alkyl, and $R_d$ is $C_1$–$C_{12}$alkyl or phenyl which is unsubstituted or substituted by $C_1$–$C_4$alkyl or $C_1$–$C_4$alkoxy, and the sum of the C atoms in the radical —$CR_bR_cR_d$ is 3 to 18. Examples of alkyl are i-propyl, i- and t-butyl, 1-methyl or 1,1-dimethylprop-1-yl, 1-methyl- or 1,1-dimethylbut-1-yl, 1-methyl- or 1,1-dimethylpenty-1-yl, 1-methyl-or 1,1-dimethylhex-1-yl, 1-methyl- or 1,1-dimethylhept-1-yl, 1-methyl- or 1,1-dimethyloct-1-yl, 1-methyl- or 1,1-dimethylnon-1-yl, 1-methyl- or 1,1-dimethyldec-1-yl, 1-methyl- or 1,1-dimethylundec-1-yl, 1-methyl- or 1,1-dimethyldodec-1-yl, 1-methyl- or 1,1-dimethyltridec-1-yl, 1-methyl- or 1,1-dimethyltetradec-1-yl, 1-methyl- or 1,1-dimethylpentadec-1-yl, 1-methyl- or 1,1-dimethylhexadec-1-yl, 1-methylheptadec-1-yl and phenyl-dimethyl-methyl. Preferred examples are i-propyl and i- and t-butyl.

In the osmium compounds used, $R_{29}$, $R_{30}$ and $R_{31}$ can also be linear alkyl having 1 to 18, preferably 1 to 12, more preferably 1 to 8, and particularly preferably 1 to 6 C atoms, for example, methyl, ethyl, n-propyl, n-butyl, n-pentyl, n-hexyl, n-heptyl and n-octyl.

Cycloalkyl $R_{29}$, $R_{30}$ and $R_{31}$ is preferably $C_5$–$C_8$cycloalkyl, and particularly preferably $C_5$— or $C_6$cycloalkyl. Some examples are cyclobutyl, cycloheptyl, cyclooctyl and, in particular, cyclopentyl and cyclohexyl, which are preferably unsubstituted or substituted by 1 to 3 alkyl, haloalkyl or alkoxy groups. Examples of substituted cycloalkyl are methyl-, dimethyl-, trimethyl-, methoxy-, dimethoxy-, trimethoxy-, trifluoromethyl-, bistrifluoromethyl and tristrifluoromethylcyclopentyl and -cyclohexyl.

Aryl $R_{29}$, $R_{30}$ and $R_{31}$ is preferably $C_6$–$C_{12}$aryl, and particularly preferably phenyl or naphthyl. Examples of substituted aryl are methyl-, dimethyl-, trimethyl-, methoxy-, dimethoxy-, trimethoxy-, trifluoromethyl-, bistrifluoromethyl and tristrifluoromethylphenyl.

Examples of optionally substituted or fused tetra- and pentamethylene bonded to the P atom are

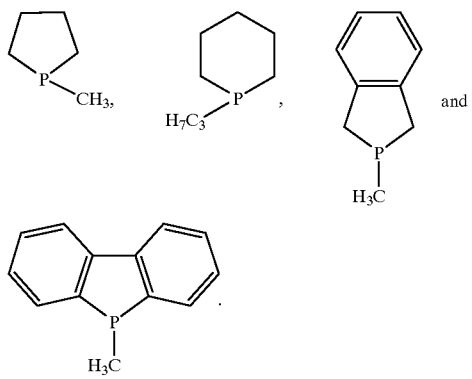

Other suitable tertiary phosphines are cycloaliphatics which have 6 to 8 ring carbon atoms and are bridged with a =PRa group, for example

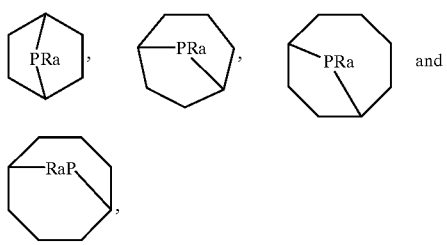

in which Ra is $C_1$–$C_6$alkyl, cyclohexyl, or phenyl which is unsubstituted or substituted by 1 or 2 $C_1$–$C_4$alkyl.

In a preferred embodiment, the phosphine ligands correspond to the formula VI, in which $R_{29}$, $R_{30}$ and $R_{31}$ independently of one another are α-branched $C_3$–$C_8$alkyl, cyclopentyl or cyclohexyl which are unsubstituted or substituted by $C_1$–$C_4$alkyl, or phenyl which is unsubstituted or substituted by $C_1$–$C_4$alkyl, $C_1$–$C_4$alkyl [sic], $C_1$–$C_4$alkoxy or trifluoromethyl. Particularly preferred examples of phosphine ligands of the formula VI are $(C_6H_5)_3P$, $(C_5H_9)_3P$, $(C_6H_{11})_3P$, $(i{-}C_3H_7)_3P$, $(i{-}C_4H_9)_3P$, $(t{-}C_4H_9)_3P$, $[C_2H_5CH(CH_3)]_3P$, $[C_2H_5CH(CH_3)_2]_3P$, (2-methylphenyl)$_3$P, (2,3-dimethylphenyl)$_3$P, (2,4-dimethylphenyl)$_3$P, (2,6-dimethylphenyl)$_3$P, (2-methyl-4-i-propylphenyl)$_3$P, (2-methyl-3-i-propylphenyl)$_3$P, (2-methyl-5-i-propylphenyl)$_3$P, (2-methyl-6-i-propylphenyl)$_3$P, (2-methyl-3-t-butylphenyl)$_3$P, (2-methyl4-t-butylphenyl)$_3$P, (2-methyl-5-i-butylphenyl)$_3$P, (2,3-di-t-butylphenyl)$_3$P, (2,4-di-t-butylphenyl)$_3$P, (2,5-di-t-butylphenyl) $_3$P and (2,6-di-t-butylphenyl)$_3$P.

Suitable anions of inorganic or organic acids are, for example, hydride ($H^\ominus$), halide (for example $F^\ominus$, $Cl^\ominus \cdot Br^\ominus$ and $I^\ominus$), the anion of an oxygen acid and $BF_4^\ominus$, $PF_6^\ominus$, $SbF_6^\ominus$ or $AsF_6^\ominus$. It should be mentioned that the above-mentioned cyclopentadienyl is a ligand and an anion. Further suitable anions are $C_1$–$C_{12}$—, preferably $C_1$–$C_6$—, and particularly preferably $C_1$–$C_4$alcoholates, which, in particular, are branched, for example correspond to the formula $R_xR_yR_zC{-}O^\ominus$, in which $R_x$ is H or $C_1$–$C_{10}$alkyl, $R_y$ is $C_1$–$C_{10}$alkyl and $R_z$ is $C_1$–$C_{10}$alkyl or phenyl, and the sum of the C atoms of $R_x$, $R_y$ and $R_z$ is 11. Examples are, in particular, i-propyloxy and t-butyloxy.

Other suitable anions are $C_3$–$C_{18}$—, preferably $C_5$–$C_{14}$—, and particularly preferably $C_5$–$C_{12}$acetylides, which can correspond to the formula $R_w{-}C{\equiv}C^\ominus$, in which $R_w$ is $C_1$–$C_{16}$alkyl, preferably α-branched $C_3$–$C_{12}$alkyl, or is phenyl or benzyl which are unsubstituted or substituted by 1 to 3 $C_1$–$C_4$alkyl or $C_1$–$C_4$alkoxy. Some examples are i-propyl-, i- and t-butyl-, phenyl-, benzyl-, 2-methyl-, 2,6-dimethyl-, 2-i-propyl-, 2-i-propyl-6-methyl-, 2-t-butyl-, 2,6-di-t-butyl- and 2-methyl-6-t-butylphenylacetylide.

The anions of oxygen acids can be, for example, sulfate, phosphate, perchlorate, perbromate, periodate, antimonate, arsenate, nitrate, carbonate, the anion of a $C_1$–$C_8$carboxylic acid, such as, for example, formate, acetate, propionate, butyrate, benzoate, phenylacetate or mono-, di- or trichloro-or -fluoroacetate, sulfonates, such as, for example, methylsulfonate, ethylsulfonate, propylsulfonate, butylsulfonate, trifluoromethylsulfonate (triflate) or phenylsulfonate or benzylsulfonate which are optionally substituted by $C_1$–$C_4$alkyl, $C_1$–$C_4$alkoxyl or halogen, in particular fluorine or bromine, for example tosylate, mesylate, brosylate, p-methoxy- or p-ethoxyphenylsulfonate, pentafluorophenylsulfonate or 2,4,6-triisopropylsulfonate, and phosphates, for example methylphosphonate, ethylphosphonate, propylphosphonate, butylphosphonate, phenylphosphonate, p-methylphosphonate or benzylphosphonate.

$H^\ominus$, $F^\ominus$, $Cl^\ominus$, $Br^\ominus$, $BF_4^\ominus$, $PF_6^\ominus$, $SbF_6^\ominus$, $AsF_6^\ominus$, $CF_3SO_3^\ominus$, $C_6H_{5-SO3}^\ominus$, 4-methyl-$C_6H_5{-}SO_3^\ominus$, 3,5-dimethyl-$C_6H_5{-}SO_3^\ominus$, 2,4,6-trimethyl-$C_6H_5{-}SO_3^\ominus$ and 4-$CF_3{-}C_6H_5{-}SO_3^\ominus$ are particularly preferred.

In a preferred embodiment, the ruthenium and osmium compounds particularly preferably correspond to the formulae VII, VIIa, VIIb, VIIc or VIId $$Me^{2\ominus}(L_1)_2(L_2)(Y_1^\ominus)_2 \qquad \text{(VII)}$$

$$Me^{2\ominus}(L_1)_3(Y_1^\ominus)_2 \qquad \text{(VIIa)}$$

$$Me^{2\ominus}(L_1)_2L_3((Y_1^\ominus) \qquad \text{(VIIb)}$$

$$Me^{2\ominus}(L_1)_3L_4(Y_1^\ominus)_2 \qquad \text{(VIIc)}$$

$$Me^{2\ominus}L_1(L_2)_3(Y_1^\ominus)_2 \qquad \text{(VIId)}$$

in which

Me is Ru or Os;

$Y_1$ is the anion of a monobasic acid;

$L_1$ is a phosphine of the formula VI or VIa, $L_2$ is a neutral ligand;

$L_3$ is a cyclopentadienyl which is unsubstituted or substituted by $C_1$–$C_4$alkyl; and $L_4$ is CO.

The above preferences apply to the individual meanings of $L_1$, $L_2$, $L_3$ and $Y_1$.

In a particularly preferred embodiment, $L_2$ in formula VII and VIId is a $C_1$–$C_4$alkanol, $Y_1$ in the formulae VII, VIIa and VIId is an anion of a monobasic acid, $Y_1$ in formula VIIb is Cl or Br, $Y_1$ in formula VIIc is H, and $L_1$ in the formulae VII to VIId is tri-i-propylphosphine, tricyclohexylphosphine, triphenylphosphine or triphenylphosphine which is substituted by 1 to 3 $C_1$–$C_4$alkyl in the phenyl groups.

The ruthenium and osmium compounds to be used according to the invention are known or can be prepared by known and analogous processes starting from the metal halides [for example $MeX_3$, (Me-arene$X_2$)$_2$ or [Me(diolefin)$X_2]_2$] and reaction with phosphines and agents which form ligands.

The composition according to the invention can additionally comprise other non-volatile open-chain comonomers which form copolymers with the strained cycloolefins. If dienes, for example, are co-used, crosslinked polymers can form. Some examples of such comonomers are olefinically mono- or di-unsaturated compounds, such as olefins and dienes from the group consisting of pentene, hexene, heptene, octene, decene and dodecylene, acrylic and methacrylic acid, esters and amides thereof, vinyl ether, styrene, butadiene, isoprene and chlorobutadiene.

The other olefins which are capable of metathesis polymerization are contained in the composition according to the invention, for example, in an amount of up to 80% by weight, preferably 0.1 to 80% by weight, more preferably 0.5 to 60% by weight, and particularly preferably 5 to 40% by weight, based on the total amount of compounds of the formula I and other olefins capable of metathesis polymerization.

The composition according to the invention can comprise formulation auxiliaries. Known auxiliaries are antistatics, antioxidants, light stabilizers, plasticizers, dyes, pigments, fillers, reinforcing fillers, lubricants, adhesion promoters, viscosity-increasing agents and mold release auxiliaries. The fillers can be present in surprisingly high proportions without adversely influencing the polymerization, for example in amounts of up to 70% by weight, preferably 1 to 70% by weight, more preferably 5 to 60% by weight, particularly preferably 10 to 50% by weight, and especially preferably 10 to 40% by weight, based on the composition. A very large number of fillers and reinforcing fillers for improving the optical, physical, mechanical and electrical properties have been disclosed. Some examples are glass and quartz in the form of powders, beads and fibers, metal and semimetal oxides, carbonates, such as $MgCO_3$, $CaCO_3$ and dolomite, metal sulfates, such as gypsum and baryte, naturally occurring and synthetic silicates, such as talc, zeolites, wollastonite and felspars, aluminas, such as china clay, rock powders, whiskers, carbon fibers, synthetic fibers, powdered plastics and carbon black. Viscosity-increasing agents are, in particular metathesis polymers which contain olefinically unsaturated groups and can be incorporated into the polymer during the polymerization. Such metathesis polymers are known and are commercially obtainable, for example under the tradename Vestenamere®. Other viscosity-increasing agents are polybutadiene, polyisoprene or polychlorobutadiene, as well as copolymers of butadiene, isoprene and chloroprene with olefins. The viscosity increasing agents can be contained in an amount of 0.1 to 50, preferably 1 to 30, and particularly preferably 1 to 20% by weight, based on the composition.

Catalytic quantities in the context of the present invention preferably means an amount of 0.0001 to 20 mol %, particularly preferably 0.001 to 15 mol %, and especially preferably 0.001 to 10 mol %, based on the amount of the monomer.

The invention also relates to a process for thermal metathesis polymerization, which is characterized in that a composition of (a) at least one strained cycloolefin and (b) a catalytic quantity of at least one divalent-cationic compound of ruthenium or osmium in which the ruthenium or osmium compound contains a metal atom to which are bound 1 to 3 tertiary phosphine ligands with, in the case of ruthenium compounds, sterically exacting substituents, optionally non-photolabile neutral ligands and anions for charge balancing, with the proviso that in ruthenium (trisphenylphosphine)dihalides or hydride-halides the phenyl groups are substituted by $C_1$–$C_{18}$alkyl, $C_1$–$C_{18}$haloalkyl or $C_1$–$C_{18}$alkoxy, is polymerized.

The process according to the invention can be carried out in the presence of an inert solvent. A particular advantage of the process according to the invention is one that, in the case of liquid monomers, the process can be carried out without the use of a solvent. Inert means that the choice of solvent depends on the reactivity of the ruthenium and osmium compounds, for example that protic polar solvents are not used if substitution reactions, such as the replacement of halogen by alkoxy, are to be expected.

Suitable inert solvents are, for example, protic-polar and aprotic solvents, which can be used by themselves or in mixtures of at least two solvents. Examples are: ethers (dibutyl ether, tetrahydrofuran, dioxane, ethylene glycol monomethyl or dimethyl ether, ethylene glycol monoethyl or diethyl ether, diethylene glycol diethyl ether, triethylene glycol dimethyl ether), halogenated hydrocarbons (methylene chloride, chloroform, 1,2-dichloroethane, 1,1,1-trichloroethane, 1,1,2,2-tetrachloroethane), carboxylic acid esters and lactones (ethyl acetate, methyl propionate, ethyl benzoate, 2-methoxyethyl acetate, γ-butyrolactone, δ-valerolactone, pivalolactone), carboxylic acid amides and lactams (N,N-dimethylformamide, N,N-diethylformamide, N,N-dimethylacetamide, tetramethylurea, hexamethylphosphoric acid triamine, γ-butyrolactam, ε-caprolactam, N-methylpyrrolidone, N-acetylpyrrolidone, N-methylcaprolactam), sulfoxides (dimethyl sulfoxide), sulfones (dimethyl sulfone, diethyl sulfone, trimethylene sulfone, tetramethylene sulfone), tertiary amines (N-methylpiperidine, N-methylmorpholine), aliphatic and aromatic hydrocarbons, for example petroleum ether, pentane, hexane, cyclohexane, methylcyclohexane, benzene or substituted benzenes (chlorobenzene, o-dichlorobenzene, 1,2,4-trichlorobenzene, nitrobenzene, toluene, xylene) and nitriles (acetonitrile, propionitrile, benzonitrile, phenylacetonitrile). Preferred solvents are protic polar and non-polar solvents.

Preferred solvents are alkanols and aromatic hydrocarbons, and mixtures of such solvents.

A particular advantage of the catalysts to be used according to the invention is their stability to water and polar protic solvents, which can therefore likewise be used as solvents.

It is to be particularly emphasized that the compositions of an optionally substituted cycloolefin and catalyst which are employed according to the invention in the process are often insensitive to oxygen, which allows storage and a reaction procedure without an inert gas. Many of these compositions also have a good storage stability, which likewise simplifies their processing.

The monomers of the formula I and the catalysts employed for the process according to the invention can be stored both separately and together as a mixture, since the catalyst used has a particularly high stability. Before the photochemical polymerization, the mixture can be stored as a ready-to-use formulation, which is of advantage for use of the process according to the invention on a large industrial scale. Storage and processing do not have to be carried out with exclusion of light, since the catalysts used are not capable of initiating photometathesis polymerization.

The reaction temperature essentially depends on the activity, the amount and the heat stability of the catalysts used. Some catalysts are so active that they are capable of already initiating the polymerization at room temperature.

The process according to the invention can be carried out at room temperature or slightly elevated temperature, preferably at least 40° C., and more preferably at least 60° C. In particular, the process according to the invention is carried out at temperatures from 40 to 300° C., preferably 40 to 250°

C., particularly preferably 40 to to [sic] 200° C., and especially preferably 60 to 140° C. After the polymerization, it may be advantageous to after-heat the polymers at elevated temperatures, for example 80 to 200° C.

As is known, the cycloolefins are strained rings. Cyclohexene generally cannot be polymerized by olefin metathesis. This exception is known to the expert as described, for example, in Ivin [Ivin, K. J. in: Ivin, K. J., Saegusa, T. (editors), Ring-Opening Polymerisation 1:139–144 Elsevier Applied Science Publishers, London and New York (1984)].

The polymers prepared according to the invention can be homopolymers or copolymers with random distribution of the structural units, graft polymers or block polymers, and crosslinked polymers of this type. They can have an average molecular weight ($\overline{Mw}$) of, for example, 500 up to 2 million daltons, preferably 1000 to 1 million daltons (determined by GPC by comparison with polystyrene standards of narrow distribution). If the cycloolefins contain at least 2 double bonds, crosslinked polymers can also be formed.

Thermoplastically deformable materials for the production of all types of shaped articles and coatings can be prepared by the process according to the invention. Shaping and polymerization are preferably combined in solvent-free reactive systems, it being possible for processing procedures such as injection molding, extrusion and polymerization in predetermined forms (if appropriate under pressure) to be used.

The polymers according to the invention can have very different properties, depending on the monomer used. Some of them are distinguished by a very high permeability to oxygen, low dielectric constants, good heat stability and low absorption of water. Others have outstanding optical properties, for example high transparency and low refractive indices. The low shrinkage is furthermore to be emphasized in particular. They can therefore be used in very different industrial fields.

As layers on the surfaces of carrier materials, the compositions according to the invention are distinguished by a high adhesive strength. The coated materials are furthermore distinguished by a very high surface smoothness and gloss. Of the good mechanical properties, the low shrinkage and the high impact strength, as well as the heat stability is [sic] to be emphasized in particular. The easy release from the mold and the high resistance to solvents is [sic] furthermore to be mentioned.

These polymers are suitable for the production of medical equipment, implants or contact lenses; for the production of electronic components; as binders for coatings; as photocurable compositions for model construction or as adhesives for gluing substrates with low surface energies (for example Teflon, polyethylene and polypropylene). The polymers prepared according to the invention can also be used for the production of coatings by photopolymerization, it being possible on the one hand for clear (transparent) and even pigmented compositions to be used. Both white and colored pigments can be used. The production of shaped articles by thermoplastic shaping processes for all types of commodity articles may furthermore be mentioned.

The polymerizable compositions to be used according to the invention are also suitable for the production of protective coatings. The invention also relates to a variant of the process according to the invention for the production of coated materials in which a composition of a cyclical olefin, catalyst and optionally solvent is applied as a layer to a carrier, for example by dipping, brushing, pouring, rolling, knife-coating or whirler pouring processes, the solvent is removed, if appropriate, and the layer is heated for polymerization. Surfaces of substrates can be modified by this process.

The present invention also relates to a carrier material which is coated with an oligomer or polymer according to the invention and comprises a crosslinking agent. The present invention also relates to a carrier material which is coated with an oligomer or polymer according to the invention. These materials are suitable for the production of protective coatings or images in relief by irradiation (if appropriate under a photomask) and subsequent development with a solvent. Suitable crosslinking agents, which can be contained, for example, in an amount of 0.01 to 20% by weight, are, above all, organic bisazides, in particular the commercially available 2,6-bis(4-azidobenzylidene)4-methyl-cyclohexanone.

The present invention furthermore also relates to a coated carrier material, which is characterized in that a layer of (a) at least one strained cycloolefin and (b) a catalytic quantity of at least one divalent-cationic compound of ruthenium or osmium, in which the compound of ruthenium or osmium contains a metal atom to which are bound 1 to 3 tertiary phosphine ligands with, in the case of the ruthenium compounds, sterically exacting substituents, optionally non-photolabile neutral ligands and anions for charge balancing, with the proviso that in ruthenium (trisphenylphosphine) dihalides or hydride-halides the phenyl groups are substituted by $C_1$–$C_{18}$alkyl, $C_1$–$C_{18}$haloalkyl or $C_1$–$C_{18}$alkoxy, is applied to a carrier.

The present invention also relates to the use of a divalent-cationic compound of ruthenium or osmium, in which the compound of ruthenium or osmium contains a metal atom to which are bound 1 to 3 tertiary phosphine ligands with, in the case of the ruthenium compounds, sterically exacting substituents, optionally non-photolabile neutral ligands and anions for charge balancing, with the proviso that in ruthenium (trisphenylphosphine)dihalides or hydride-halides, the phenyl groups are substituted by $C_1$–$C_{18}$alkyl, $C_1$–$C_{18}$haloalkyl or $C_1$–$C_{18}$alkoxy, as catalysts for thermal metathesis polymerization of strained cycloolefins.

Suitable carrier materials are, for example, those of glass, minerals, ceramics, plastics, wood, semimetals, metals, metal oxides and metal nitrides. The layer thicknesses essentially depend on the desired use and can be, for example, 0.1 to 1000 μm, preferably 0.5 to 500 μm, particularly preferably 1 to 100 μm. The coated materials are distinguished by a high adhesive strength and good thermal and mechanical properties.

The production of the coated materials according to the invention can be carried out by known methods, for example brushing, knife-coating, pouring processes, such as curtain coating or whirler pouring.

In the case of coatings, particularly good results are often achieved if cycloolefins which additionally contain 1 to three, and preferably one further double bond and which, in the context of the invention, are polycyclical fused ring systems or ring systems linked directly or via bridge groups are used for the polymerization. The following examples illustrate the invention further.

EXAMPLES 1 AND 2

Polymerization of dicyclopentadiene in bulk 2 g of biscyclopentadiene are mixed with 12 g of catalyst and the mixture is poured into a mold. Polymerization is then carried out for the times and at the temperatures stated in Table 1 and after-curing is carried out for 2 hours at 150° C.

The following catalysts are used (abbreviations: MeOH: methanol, Tos: tosylate, Cp: cyclopentadienyl, Ph: phenyl, Cy: cyclohexyl):

A=Ru(PCy$_3$)$_2$(MeOH)$_2$(Tos)$_2$
B=RuCl$_2$(PCy$_3$)$_2$
C=Ru(H)$_2$(CO)(PPh$_3$)$_3$
D=RuCpCl(PPh$_3$)$_3$
E=RuCl$_2$[P(2-methyl-C$_6$H$_4$)$_3$]$_3$

TABLE 1

| Example | Catalyst | Conversion in % | Time, temperature | Polymer* |
|---|---|---|---|---|
| 1 | A | 100 | 12 hours; 80° C. | Tg = 122° C. |
| 2 | B | 100 | 12 hours; 100° C. | Tg = 118° C. |

*crosslinked

EXAMPLES 3 TO 7

Polymerization of norbornene 500 mg of norbornene are dissolved in 3 ml of chloroform and the solution is mixed with 3 mg of catalyst. Polymerization is then carried out for the times and at the temperatures stated in Table 2. RT in Table 2 means room temperature. The conversion is determined after precipitation with ethanol.

TABLE 2

| Example | Catalyst | Conversion in % | Time, temperature | Mw | Mw/Mn |
|---|---|---|---|---|---|
| 3 | A | 97.5 | 10 minutes; RT | 540 k | 1.9 |
| 4 | B | 93 | 15 minutes; RT | 300 k | 2.0 |
| 5 | C | 25 | 2 hours; 50° C. | crosslinked | |
| 6 | D | 30 | 10 hours; 50° C. | 80 k | 2.4 |
| 7 | E | 65 | 10 hours; 50° C. | crosslinked | |

We claim:

1. Composition of (a) at least one strained cycloolefin and (b) a catalytic quantity of one divalent-cationic co mpound of ruthenium or osmium, in which the compound of ruthenium or osmium contains a metal atom to which are bound 1 to 3 tertiary phosphine ligands with, in the case of the ruthenium compounds, sterically exacting substituents, nonphotolabile neutral ligands and anions for charge balancing, with the proviso that in ruthenium (trisphenylphosphine) dihalides or hydride-halides the phenyl groups are substituted by $C_1$–$C_6$alkyl, $C_1$–$C_{18}$haloalkyl or $C_1$–$C_{18}$alkoxy.

2. Composition according to claim 1, wherein the cyclical olefins are monocyclical rings or polycyclical, bridged or fused ring systems with 2 to 4 rings, which are unsubstituted or substituted and optionally contain one or more heteroatoms from the group consisting of O, S, N and Si in one or more rings and optionally contain fused, aromatic or heteroaromatic rings.

3. Composition according to claim 2, wherein the cyclical rings contain 3 to 16 ring members.

4. Composition according to claim 3, wherein the cyclical rings contain 3 to 12 ring members.

5. Composition according to claim 2, wherein the cyclical olefins contain further nonaromatic double bonds.

6. Composition according to claim 1, wherein the cycloolefins correspond to the formula I

(I)

$Q_1$ is a radical having at least one carbon atom which, together with the —CH=CQ$_2$ group, forms an at least 3-membered alicyclical ring which optionally contains one or more heteroatoms chosen from the group consisting of silicon, phosphorus, oxygen, nitrogen and sulfur; and which is unsubstituted or substituted by halogen, =O, —CN, —NO$_2$, R$_1$R$_2$R$_3$Si—(O)$_u$—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, $C_1$-$C_{20}$alkyl, $C_1$-$C_{20}$hydroxyalkyl, $C_1$-$C_{20}$haloalkyl, $C_1$-$C_6$cyanoalkyl, $C_3$-$C_8$cycloalkyl, $C_6$-$C_{16}$aryl, $C_7$-$C_{16}$aralkyl, $C_3$-$C_6$heterocycloalkyl, $C_3$-$C_{16}$heteroaryl, $C_4$—C l$_6$heteroaralkyl or R$_4$—X—; or in which two adjacent C atoms are substituted by —CO—O—CO— or —CO—NR$_5$—CO—; or in which an alicyclical, aromatic or heteroaromatic ring which is unsubstituted or substituted by halogen, —CN, —NO$_2$, R$_6$R$_7$R$_8$Si—(O)$_u$—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, $C_1$-$C_{20}$alkyl, $C_1$-$C_{20}$haloalkyl, $C_1$-$C_{20}$hydroxyalkyl, $C_1$-$C_6$cyanoalkyl, $C_3$-$C_8$cycloalkyl, $C_6$-$C_{16}$aryl, $C_7$-$C_{16}$aralkyl, $C_3$-$C_6$heterocycloalkyl, $C_3$-$C_{16}$heteroaryl, $C_4$-$C_{16}$heteroaralkyl or R$_{13}$—X$_1$— is optionally fused onto adjacent carbon atoms of the alicyclical ring;

X and X$_1$ independently of one another are —O—, —S—, —CO—, —SO—, —SO$_2$—, —O—C(O)—, —C(O)—O—, —C(O)—NR$_5$—, —NR$_{10}$—C(O)—, —SO$_2$—O— or —O—SO$_2$—;

R$_1$, R$_2$ and R$_3$ independently of one another are $C_1$–$C_{12}$alkyl, $C_1$–$C_{12}$perfluoroalkyl, phenyl or benzyl;

R$_4$ and R$_{13}$ independently are $C_1$-$C_{20}$alkyl, $C_1$-$C_{20}$haloalkyl, $C_1$-$C_{20}$hydroxyalkyl, $C_3$–$C_8$cycloalkyl, $C_6$–C16aryl or $C_7$–$C_{16}$aralkyl;

R$_5$ and R$_{10}$ independently of one another are hydrogen, $C_1$–$C_{12}$alkyl, phenyl or benzyl, where the alkyl groups in turn are unsubstituted or substituted by $C_1$–$C_{12}$alkoxy or $C_3$–$C_8$cycloalkyl;

R$_6$, R$_7$ and R$_8$ independently of one another are $C_1$–$C_{12}$alkyl, $C_1$–$C_{12}$perfluoroalkyl, phenyl or benzyl;

M is an alkali metal and M$_1$ is an alkaline earth metal; and u is 0 or 1;

where the alicyclical ring formed with Q$_1$ optionally contains further nonaromatic double bonds;

Q$_2$ is hydrogen, $C_1$–$C_{20}$alkyl, $C_1$–$C_{20}$haloalkyl, $C_1$–$C_{12}$alkoxy, halogen, —CN or R$_{11}$—X$_2$—;

R$_{11}$ is $C_1$-$C_{20}$alkyl, $C_1$-$C_{20}$haloalkyl, $C_1$-$C_{20}$hydroxyalkyl, $C_3$–$C_8$cycloalkyl, $C_6$–$C_{16}$aryl or $C_7$–$C_{16}$aralkyl;

X$_2$ is —C(O)—O— or —C(O)—NR$_{12}$—;

R$_{12}$ is hydrogen, $C_1$–$C_{12}$alkyl, phenyl or benzyl;

where the abovementioned cycloalkyl, heterocycloalkyl, aryl, heteroaryl, aralkyl and heteroaralkyl groups are unsubstituted or substituted by $C_1$–$C_{12}$alkyl, $C_1$–$C_{12}$alkoxy, —NO$_2$, —CN or halogen, and where the heteroatoms of the abovementioned heterocycloalkyl, heteroaryl and heteroaralkyl groups are chosen from the group consisting of —O—, —S—, —NR$_9$— and —N=; and R$_9$ is hydrogen, $C_1$–$C_{12}$alkyl, phenyl or benzyl.

7. Composition according to claim 6, wherein the alicyclical ring which $Q_1$ forms together with the —CH=CQ$_2$— groups has 3 to 16 ring atoms, the ring system being a monocyclical, bicyclical, tricyclical or tetracyclical ring system.

8. Composition according to claim 6, wherein $Q_2$ in formula I is hydrogen.

9. Composition according to claim 6, wherein in the compounds of the formula I $Q_1$ is a radical with at least one carbon atom which, together with the —CH=CQ$_2$— group, forms a 3- to 20-membered alicyclical ring which optionally contains one or more heteroatoms chosen from the group consisting of silicon, oxygen, nitrogen and sulfur; and which is unsubstituted or substituted by halogen, =O, —CN, —NO$_2$, R$_1$R$_2$R$_3$Si—(O)$_u$—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, C$_1$–C$_{12}$alkyl, C$_1$–C$_{12}$haloalkyl, C$_1$–C$_{12}$hydroxyalkyl, C$_1$–C$_4$cyanoalkyl, C$_3$–C$_6$cycloalkyl, C$_6$–C$_{12}$aryl, C$_7$–C$_{12}$aralkyl, C$_3$–C$_6$heterocycloalkyl, C$_3$–C$_{12}$heteroaryl, C$_4$–C$_{12}$heteroaralkyl or R$_4$—X—; or in which two adjacent C atoms in this radical Q$_1$ are substituted by —CO—O—CO— or —CO—NR$_5$—CO—; or in which an alicyclical, aromatic or heteroaromatic ring which is unsubstituted or substituted by halogen, —CN, —NO$_2$, R$_6$R$_7$R$_8$Si—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, C$_1$–C$_{12}$alkyl, C$_1$–C$_{12}$haloalkyl, C$_1$–C$_{12}$hydroxyalkyl, C$_1$–C$_4$cyanoalkyl, C$_3$–C$_6$cycloalkyl, C$_6$–C$_{12}$aryl, C$_7$–C$_{12}$aralkyl, C$_3$–C$_6$heterocycloalkyl, C$_3$–C$_{12}$heteroaryl, C$_4$–C$_{12}$heteroaralkyl or R$_{13}$—X$_1$— is optionally fused onto adjacent carbon atoms;

X and X$_1$ independently of one another are —O—, —S—, —CO—, —SO—, —SO$_2$—, —O—C(O)—, —C(O)—O—, —C(O)—NR$_5$—, —NR$_{10}$—C(O)—, —SO$_2$—O— or —O—SO$_2$—;

R$_1$, R$_2$ and R$_3$ independently of one another are C$_1$–C$_6$alkyl, C$_1$–C$_6$perfluoroalkyl, phenyl or benzyl;

M is an alkali metal and M$_1$ is an alkaline earth metal;

R$_4$ and R$_{13}$ independently of one another are C$_1$–C$_{12}$alkyl, C$_1$–C$_{12}$haloalkyl, C$_1$–C$_{12}$hydroxyalkyl, C$_3$–C$_8$cycloalkyl, C$_6$–C$_{12}$aryl or C$_7$–C$_{12}$aralkyl;

R$_5$ and R$_{10}$ independently of one another are hydrogen, C$_1$–C$_6$alkyl, phenyl or benzyl, where the alkyl groups in turn are unsubstituted or substituted by C$_1$–C$_6$alkoxy or C$_3$–C$_6$cycloalkyl;

R$_6$, R$_7$ and R$_8$ independently of one another are C$_1$–C$_6$alkyl, C$_1$–C$_6$perfluoroalkyl, phenyl or benzyl;

u is 0 or 1;

where the alicyclical ring formed with Q$_1$ optionally contains further nonaromatic double bonds;

$Q_2$ is hydrogen, C$_1$–C$_{12}$alkyl, C$_1$–C$_{12}$haloalkyl, C$_1$–C$_6$alkoxy, halogen, —CN or R$_{11}$—X$_2$—;

R$_{11}$ is C$_1$–C$_{12}$alkyl, C$_1$–C$_{12}$haloalkyl, C$_1$–C$_{12}$hydroxyalkyl, C$_3$–C$_6$cycloalkyl, C$_6$–C$_{12}$aryl or C$_7$–C$_{12}$aralkyl;

X$_2$ is —C(O)—O— or —C(O)—NR$_{12}$; and

R$_{12}$ is hydrogen, C$_1$–C$_6$alkyl, phenyl or benzyl;

where the cycloalkyl, heterocycloalkyl, aryl, heteroaryl, aralkyl and heteroaralkyl groups are unsubstituted or substituted by C$_1$–C$_6$alkyl, C$_1$–C$_6$alkoxy, —NO$_2$, —CN or halogen, and where the heteroatoms of the heterocycloalkyl, heteroaryl and heteroaralkyl groups are chosen from the group consisting of —O—, —S—, —NR$_9$— and —N=; and R$_9$ is hydrogen, C$_1$–C$_6$alkyl, phenyl or benzyl.

10. Composition according to claim 6, wherein in the compounds of the formula I $Q_1$ is a radical with at least one carbon atom which, together with the —CH=CQ$_2$— group, forms a 3- to 10-membered alicyclical ring which optionally contains a heteroatom chosen from the group consisting of silicon, oxygen, nitrogen and sulfur and is unsubstituted or substituted by halogen, —CN, —NO$_2$, R$_1$R$_2$R$_3$Si—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, C$_1$–C$_6$alkyl, C$_1$–C$_6$haloalkyl, C$_1$–C$_6$hydroxyalkyl, C$_1$–C$_4$cyanoalkyl, C$_3$–C$_6$cycloalkyl, phenyl, benzyl or R$_4$—X—; or in which an alicyclical, aromatic or heteroaromatic ring which is unsubstituted or substituted by halogen, —CN, —NO$_2$, R$_6$R$_7$R$_8$Si—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, C$_1$–C$_6$alkyl, C$_1$–C$_6$haloalkyl, C$_1$–C$_6$hydroxyalkyl, C$_1$–C$_4$cyanoalkyl, C$_3$–C$_6$cycloalkyl, phenyl, benzyl or R$_{13}$—X$_1$— is optionally fused onto adjacent carbon atoms;

R$_1$, R$_2$ and R$_3$ independently of one another are C$_1$–C$_4$alkyl, C$_1$–C$_4$perfluoroalkyl, phenyl or benzyl;

M is an alkali metal and M$_1$ is an alkaline earth metal;

R$_4$ and R$_{13}$ independently of one another are C$_1$–C$_6$alkyl, C$_1$–C$_6$haloalkyl, C$_1$–C$_6$hydroxyalkyl or C$_3$–C$_6$cycloalkyl;

X and X$_1$ independently of one another are —O—, —S—, —CO—, —SO—or —SO$_2$—;

R$_6$, R$_7$ and R$_8$ independently of one another are C$_1$–C$_4$alkyl, C$_1$–C$_4$perfluoroalkyl, phenyl or benzyl;

and $Q_2$ is hydrogen.

11. Composition according to claim 1, wherein the cyclical olefins are norbornene or norbornene derivatives.

12. Composition according to claim 11, characterized in that the norbornene derivatives are those of the formula II

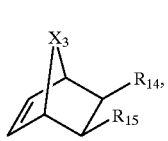

(II)

in which

X$_3$ is —CHR$_{16}$—, oxygen or sulfur;

R$_{14}$ and R$_{15}$ independently of one another are hydrogen, —CN, trifluoromethyl, (CH$_3$)$_3$Si—O—, (CH$_3$)$_3$Si— or —COOR$_{17}$; and R$_{16}$ and R$_{17}$ independently of one another are hydrogen, C$_1$–C$_{12}$—alkyl, phenyl or benzyl;

or those of the formula III

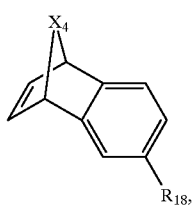

(III)

in which

X$_4$ is —CHR$_{19}$—, oxygen or sulfur;

$R_{19}$ is hydrogen, $C_1$–$C_{12}$alkyl, phenyl or benzyl; and $R_{18}$ is hydrogen, $C_1$–$C_6$alkyl or halogen;

or those of the formula IV

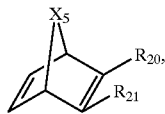
(IV)

in which $X_5$ is —$CHR_{22}$—, oxygen or sulfur;

$R_{22}$ is hydrogen, $C_1$–$C_{12}$alkyl, phenyl or benzyl;

$R_{20}$ and $R_{21}$ independently of one another are hydrogen, CN, trifluoromethyl, $(CH_3)_3Si$—O—, $(CH_3)_3Si$— or —$COOR_{23}$; and $R_{23}$ is hydrogen, $C_1$–$C_{12}$alkyl, phenyl or benzyl;

or those of the formula V

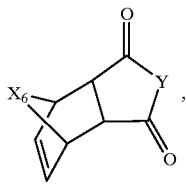
(V)

in which $X_6$ is —$CHR_{24}$—, oxygen or sulfur;

$R_{24}$ is hydrogen, $C_1$–$C_{12}$alkyl, phenyl or benzyl;

Y is oxygen or

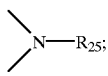

and $R_{25}$ is hydrogen, methyl, ethyl or phenyl.

13. Composition according to claim 1, wherein the strained cycloolefins contain only carbon and hydrogen atoms.

14. Composition according to claim 1, wherein the strained cyclolefins are 5- or 6-membered rings or ring systems with one to three 5- or 6-membered rings.

15. Composition according to claim 1, wherein the strained cyclolefins are norbornenes, alkylated norbornenes and dicyclopentadiene.

16. Composition according to claim 1, wherein the strained cycloolefins are

(1)

-continued

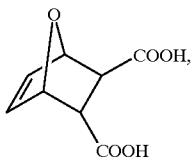
(2)

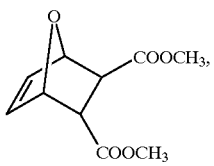
(3)

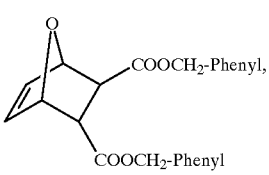
(4)

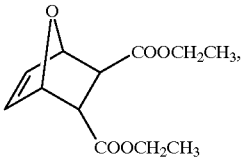
(5)

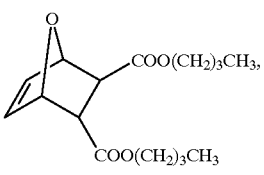
(6)

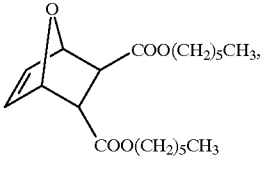
(7)

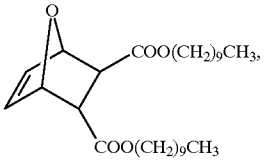
(8)

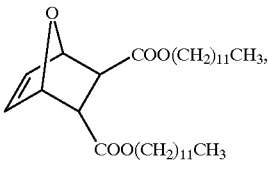
(9)

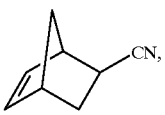
(10)

-continued
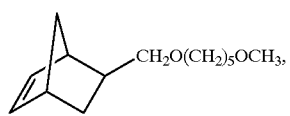 (11)
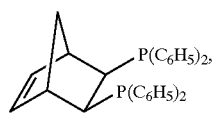 (12)
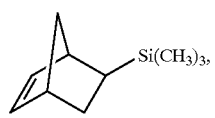 (13)
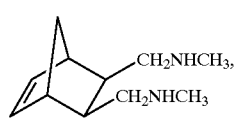 (14)
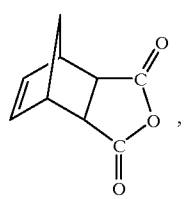 (15)
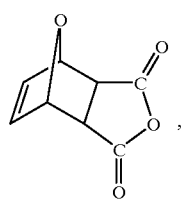 (16)
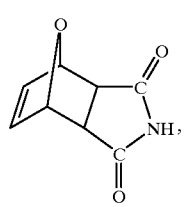 (17)
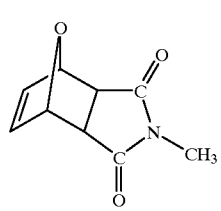 (18)
-continued
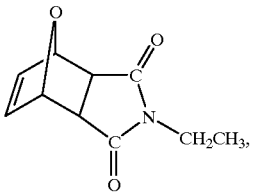 (19)
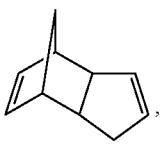 (20)
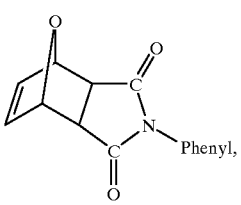 (21)
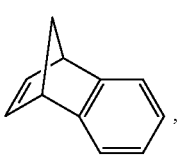 (22)
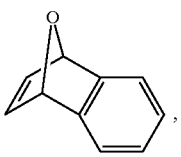 (23)
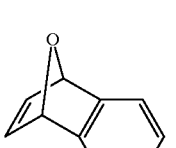 (24)
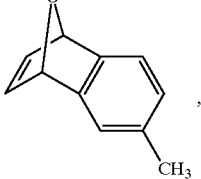 (25)
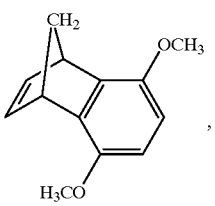 (26)

-continued

(27) 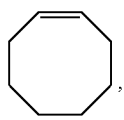,

(28) 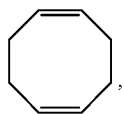,

(29) ,

(30) 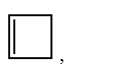,

(31) 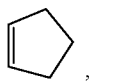,

(32) 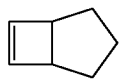,

(33) 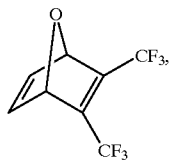,

(34) 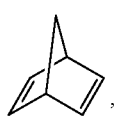,

(35) 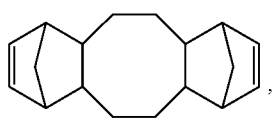,

(36) 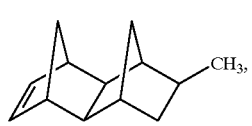,

(37) 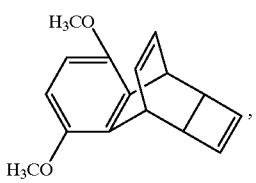,

-continued

(38) 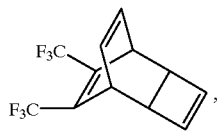,

(39) 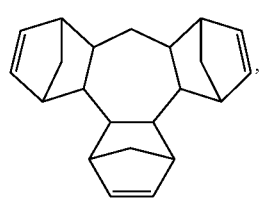,

(40) 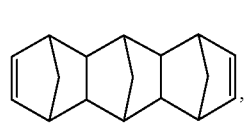,

(41) 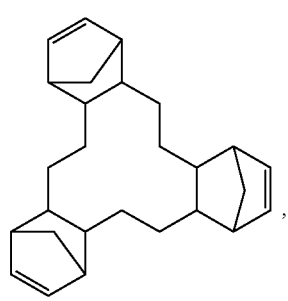,

(42) 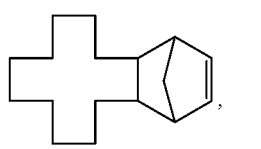,

(43) 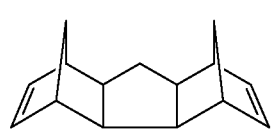 or

(44) 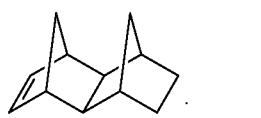.

17. Composition according to claim 1, wherein the ruthenium and osmium compounds contain 2 or 3 tertiary phosphine groups.

18. Composition according to claim 1, wherein the ruthenium and osmium compounds contain 3 phosphine groups and two monovalent anions for charge balancing; or 3 phosphine groups, two monovalent or one divalent non-photolabile neutral ligands, and two monovalent anions for charge balancing; or 2 phosphine groups, one monoanionic, additionally monovalent non-photolabile neutral ligands, and one monovalent anion for charge balancing.

19. Composition according to claim 18, wherein the monoanionic, additionally monovalent non-photolabile neutral ligands are cyclopentadienyl or indenyl, which are unsubstituted or substituted by 1 to 5 $C_1$–$C_4$alkyl or —Si$(C_1$–$C_4$alkyl).

20. Composition according to claim 18, wherein the monovalent, non-photolabile ligands are $H_2O$, $H_2S$, $NH_3$; optionally halogenated, in particular fluorinated or chlorinated, aliphatic or cycloaliphatic alcohols or mercaptans having 1 to 18 C atoms, aromatic alcohols or thiols having 6 to 18 C atoms, araliphatic alcohols or thiols having 7 to 18 C atoms; open-chain or cyclical and aliphatic, araliphatic or aromatic ethers, thioethers, sulfoxides, sulfones, ketones, aldehydes, carboxylic acid esters, lactones, optionally N—$C_1$–$C_4$mono- or -dialkylated carboxylic acid amides having 2 to 20 C atoms, and optionally N—$C_1$–$C_4$alkylated lactams; open-chain or cyclical and aliphatic, araliphatic or aromatic primary, secondary and tertiary amines having 1 to 20 C atoms.

21. Composition according to claim 1, wherein the phosphine ligands correspond to the formulae VI or VIa

$$PR_{29}R_{30}R_{31} \qquad (VI)$$

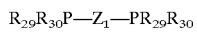

$$R_{29}R_{30}P-Z_1-PR_{29}R_{30} \qquad (VIa)$$

in which $R_{29}$, $R_{30}$ and $R_{31}$ independently of one another are α-branched $C_3$–$C_{20}$alkyl; $C_4$–$C_{12}$cycloalkyl which is unsubstituted or substituted by $C_1$–$C_{18}$alkyl, $C_1$–$C_{18}$haloalkyl or $C_1$–$C_{18}$alkoxy; or $C_6$–$C_{16}$aryl which is unsubstituted or substituted by $C_1$–$C_{18}$alkyl, $C_1$–$C_{18}$haloalkyl or $C_1$–$C_{18}$alkoxy;

the radicals $R_{29}$ and $R_{30}$ together are tetra- or pentamethylene which is unsubstituted or substituted by $C_1$–$C_6$alkyl, $C_1$–$C_6$haloalkyl or $C_1$–$C_6$alkoxy, or tetra- or pentamethylene which is unsubstituted or substituted by $C_1$–$C_6$alkyl, $C_1$–$C_6$haloalkyl or $C_1$–$C_6$alkoxy and fused with 1 or 2 1,2-phenylene, and $R_{31}$ has the abovementioned meaning; and $Z_1$ is linear or branched $C_2$–$C_{12}$alkylene which is unsubstituted or substituted by $C_1$–$C_4$alkoxy, 1,2- or 1,3-cycloalkylene which has 4 to 8 C atoms and is unsubstituted or substituted by $C_1$–$C_4$alkyl or $C_1$–$C_4$alkoxy, or 1,2 or 1,3-heterocycloalkylene which has 5 or 6 ring members and one heteroatom from the group consisting of O and N and is unsubstituted or substituted by $C_1$–$C_4$alkyl or $C_1$–$C_4$alkoxy.

22. Composition according to claim 21, wherein the α-branched alkyl is a radical of the the formula —$CR_bR_cR_d$, in which $R_b$ is H or $C_1$–$C_{12}$alkyl, $R_c$ is $C_1$–$C_{12}$alkyl, and $R_d$ is $C_1$–$C_{12}$alkyl or phenyl which is unsubstituted or substituted by $C_1$–$C_4$alkyl or $C_1$–$C_4$alkoxy, and the sum of the C atoms in the radical —$CR_bR_cR_d$ is 3 to 18.

23. Composition according to claim 21, characterized in that the phosphine ligands correspond to the formula VI in which $R_{29}$, $R_{30}$ and $R_{31}$ independently of one another are α-branched $C_3$–$C_6$alkyl, cyclopentyl or cyclohexyl which are unsubstituted or substituted by $C_1$–$C_4$alkyl, or phenyl which is unsubstituted or substituted by $C_1$–$C_4$alkyl, $C_1$–$C_4$alkyl [sic], $C_1$–$C_4$alkoxy or trifluoromethyl.

24. Composition according to claim 1, characterized in that the phosphine ligands are $(C_6H_5)_3P$, $(C_5H_9)_3P$, $(C_6H_{11})_3P$, (i—$C_3H_7)_3P$, (i—$C_4H_9)_3P$, (t—$C_4H_9)_3P$, $[C_2H_5CH(CH_3)]_3P$, $[C_2H_5CH(CH_3)_2]_3P$, (2-methylphenyl)$_3P$, (2,3-dimethylphenyl)$_3P$, (2,4-dimethylphenyl)$_3P$, (2,6-dimethylphenyl)$_3P$, (2-methyl-4-i-propylphenyl)$_3P$, (2-methyl-3-i-propylphenyl)$_3P$, (2-methyl-5-i-propylphenyl)$_3P$, (2-methyl-6-i-propylphenyl)$_3P$, (2-methyl-3-t-butylphenyl)$_3P$, (2-methyl-4-t-butylphenyl)$_3P$, (2-methyl-5-i-butylphenyl)$_3P$, (2,3-di-t-butylphenyl)$_3P$, (2,4-di-t-butylphenyl)$_3P$, (2,5-di-t-butylphenyl)$_3P$ or (2,6-di-t-butylphenyl)$_3P$.

25. Composition according to claim 1, wherein the anions of inorganic or organic acids are a hydride ($H^\ominus$), a halide, the anion of an oxygen acid, $BF_4^\ominus$, $PF_6^\ominus$, $SbF_6^\ominus$ or $AsF_6^\ominus$.

26. Composition according to claim 25, wherein the anions of oxygen acids are sulfate, phosphate, perchlorate, perbromate, periodate, antimonate, arsenate, nitrate, carbonate, the anion of a $C_1$–$C_8$carboxylic acid, sulfonate, or phenylsulfonate or benzylsulfonate which are optionally substituted by $C_1$–$C_4$alkyl, $C_1$–$C_4$alkoxy or halogen.

27. Composition according to claim 25, wherein the anions are $H^\ominus$, $Cl^\ominus$, $Br^\ominus$, $BF_4^\ominus$, $PF_6^\ominus$, $SbF_6^\ominus$, $AsF_6^\ominus$, $CF_3SO_3^\ominus$, $C_6H_5$—$SO_3^\ominus$, 4-methyl-$C_6H_5$—$SO_3^\ominus$, 3,5-dimethyl- $C_6H_5$-$SO_3^\ominus$, 2,4,6-trimethyl-$C_6H_5$—$SO_3^\ominus$ or 4—$CF_3$—$C_6H_5$—$SO_3^\ominus$.

28. Composition according to claim 1, wherein the ruthenium and osmium compounds correspond to the formulae VII, VIIa, VIIb, VIIc or VIId

$$Me^{2\oplus}(L_1)_2(L_2)(Y_1^\ominus)_2 \qquad (VII)$$

$$Me^{2\oplus}(L_1)_3(Y_1^{63})_2 \qquad (VIIa)$$

$$Me^{2\oplus}(L_1)_2L_3((Y_1^\ominus)) \qquad (VIIb)$$

$$Me^{2\oplus}(L_1)_3L_4(Y_1^\ominus)_2 \qquad (VIIc)$$

$$Me^{2\oplus}L_1(L_2)_3(Y_1^\ominus)_2 \qquad (VIId)$$

in which

Me is Ru or Os;

$Y_1$ is the anion of a monobasic acid;

$L_1$ is a phosphine of the formula VI or VIa according to claim 21, $L_2$ is a monovalent neutral ligand;

$L_3$ is cyclopentadienyl which is unsubstituted or substituted by $C_1$–$C_4$alkyl; and $L_4$ is CO.

29. Composition according to claim 28, wherein $L_2$ in formula VII and VIId is a $C_1$–$C_4$alkanol, $Y_1$ in the formulae VII, VIIa and VIId is an anion of a monobasic acid, $Y_1$ in formula VIIb is Cl or Br, $Y_1$ in formula VIIc is H, and $L_1$ in the formulae VII to VIId is tri-i-propylphosphine, tricyclohexylphosphine, triphenylphosphine or triphenylphosphine which is substituted by 1 to 3 $C_1$–$C_4$alkyl in the phenyl groups.

30. Composition according to claim 1, wherein the ruthenium and osmium compounds are present in an amount of 0.0001 to 20 mol %.

31. Process for thermal metathesis polymerization, which is characterized in that a composition of (a) at least one strained cycloolefin and (b) a catalytic quantity of at least one divalent-cationic compound of ruthenium or osmium in which the ruthenium or osmium compound contains a metal atom to which are bound 1 to 3 tertiary phosphine ligands with, in the case of ruthenium compounds, sterically exacting substituents, optionally non-photolabile neutral ligands and anions for charge balancing, with the proviso that in ruthenium (trisphenylphosphine)dihalides or hydridehalides the phenyl groups are substituted by $C_1$–$C_{18}$alkyl, $C_1$–$C_{18}$haloalkyl or $C_1$–$C_{18}$alkoxy, is polymerized.

32. Process for the production of coated materials, in which a composition according to claim 1 is applied to a carrier, the solvent is removed, if appropriate, and the layer is heated for polymerization.

33. Carrier material which is coated with an oligomer or polymer from the composition according to claim 1 and which comprises a crosslinking agent.

34. Carrier material, in which a layer of a composition according to claim 1 is applied to a substrate.

35. Coated carrier material, in which a composition of (a) at least one strained cycloolefin and (b) a catalytic quantity of at least one divalent-cationic compound of ruthenium or osmium in which the ruthenium or osmium compound contains a metal atom to which are bound 1 to 3 tertiary phosphine ligands with, in the case of ruthenium compounds, sterically exacting substituents, optionally non-photolabile neutral ligands and anions for charge balancing, with the proviso that in ruthenium (trisphenylphosphine) dihalides or hydride-halides the phenyl groups are substituted by $C_1$–$C_{18}$alkyl, $C_1$–$C_{18}$haloalkyl or $C_1$–$C_{18}$alkoxy, is polymerized.

* * * * *